US009035188B2

(12) United States Patent
Akiba et al.

(10) Patent No.: US 9,035,188 B2
(45) Date of Patent: May 19, 2015

(54) ELECTRO-CONDUCTIVE MULTIFILAMENT YARN AND ELECTRO-CONDUCTIVE BRUSH

(75) Inventors: Eiji Akiba, Osaka (JP); Masaaki Hachiya, Ichinomiya (JP); Hidetaka Yamauchi, Chiryu (JP); Bunshi Fugetsu, Sapporo (JP)

(73) Assignees: Kuraray Co., Ltd., Kurashiki-shi (JP); Chakyu Dyeing Co., Ltd., Ichinomiya-shi (JP); Tsuchiya TSCO Co., Ltd., Chiryu-shi (JP); NATIONAL UNIVERSITY CORPORATION HOKKAIDO UNIVERSITY, Sapporo-shi (JP)

( * ) Notice: Subject to any disclaimer, the term of this patent is extended or adjusted under 35 U.S.C. 154(b) by 61 days.

(21) Appl. No.: 13/579,298

(22) PCT Filed: Mar. 3, 2011

(86) PCT No.: PCT/JP2011/054974

§ 371 (c)(1), (2), (4) Date: Aug. 16, 2012

(87) PCT Pub. No.: WO2011/108669

PCT Pub. Date: Sep. 9, 2011

(65) Prior Publication Data

US 2012/0315065 A1 Dec. 13, 2012

(30) Foreign Application Priority Data

Mar. 3, 2010 (JP) ................................ 2010-046548

(51) Int. Cl.

*D02G 3/44* (2006.01)
*G03G 15/02* (2006.01)

(Continued)

(52) U.S. Cl.

CPC ........... *D06M 11/74* (2013.01); *G03G 21/0035* (2013.01); *G03G 15/0233* (2013.01)

(58) Field of Classification Search

CPC .............. D06M 11/73–11/74; G03G 15/0216; G03G 15/0225; G03G 15/0233; G03G 21/0035; H01B 2/48; D01F 8/04; D01F 1/09; D01F 9/12

USPC ...... 174/126.1, 126.4, 121 R, 121 SR, 122 R; 399/175

See application file for complete search history.

(56) References Cited

U.S. PATENT DOCUMENTS

| | | | | |
|---|---|---|---|---|
| 3,692,402 | A * | 9/1972 | Solarek | 399/287 |
| 2009/0032778 | A1 * | 2/2009 | Shirakawa | 252/511 |
| 2011/0151254 | A1 | 6/2011 | Fugetsu et al. | |

FOREIGN PATENT DOCUMENTS

| | | |
|---|---|---|
| JP | 2000 167457 | 6/2000 |
| JP | 2001 281964 | 10/2001 |

(Continued)

OTHER PUBLICATIONS

International Search Report Issued May 17, 2011 in PCT/JP11/54974 Filed Mar. 3, 2011.

*Primary Examiner* — Hoa C Nguyen
*Assistant Examiner* — Amol Patel
(74) *Attorney, Agent, or Firm* — Oblon, McClelland, Maier & Neustadt, L.L.P.

(57) ABSTRACT

An electro-conductive multifilament yarn for an electro-conductive brush that includes an electro-conductive fiber containing a synthetic fiber and a carbon nanotube covering a surface of the fiber. The synthetic fiber may have a single-filament fineness of not more than 30 dtex. The synthetic fiber may have 3 to 6 elongated recesses or grooves extending in a longitudinal direction thereof and have a multi-leaves or cross-section.

20 Claims, 1 Drawing Sheet

(51) Int. Cl.
*D06M 11/74* (2006.01)
*G03G 21/00* (2006.01)
*B82Y 30/00* (2011.01)

(56) References Cited

FOREIGN PATENT DOCUMENTS

| | | | | |
|---|---|---|---|---|
| JP | 2003 306832 | | | 10/2003 |
| JP | 2005 164951 | | | 6/2005 |
| JP | 2005 256221 | | | 9/2005 |
| JP | 2006 9177 | | | 1/2006 |
| JP | 2006 28660 | | | 2/2006 |
| JP | 2007 34196 | | | 2/2007 |
| JP | 2007 92234 | | | 4/2007 |
| JP | 2007092234 | A | * | 4/2007 |
| JP | 2007 247095 | | | 9/2007 |
| JP | 2008 196073 | | | 8/2008 |
| JP | 2008 214807 | | | 9/2008 |
| JP | 2008214807 | A | * | 9/2008 |
| WO | 2009 028379 | | | 3/2009 |
| WO | 2010 026937 | | | 3/2010 |

* cited by examiner

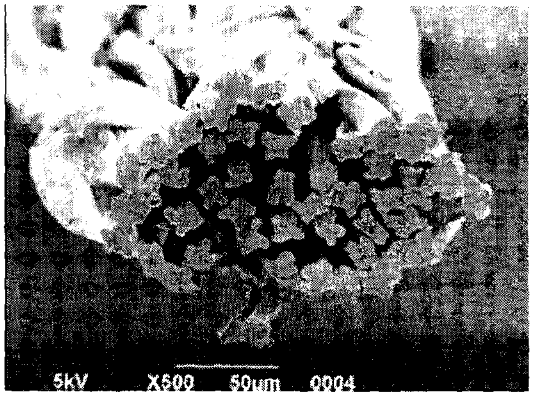
5kV X500 50um 0004

ELECTRO-CONDUCTIVE MULTIFILAMENT YARN AND ELECTRO-CONDUCTIVE BRUSH

TECHNICAL FIELD

The present invention relates to an electro-conductive multifilament yarn for forming an electro-conductive brush [for example, a roll brush or a bar brush, such as a cleaning brush, a charging brush (or an electrostatic control brush), or a static removal brush (or an anti-static brush or a discharging brush)] equipped with a printing apparatus using electrophotography (an electrophotographic apparatus) [for example, a duplicator (a copying machine), a facsimile machine, and a printer], and to an electro-conductive brush formed from the electro-conductive multifilament yarn.

BACKGROUND ART

Electrophotography (or xerography) is now in rapidly widespread use in a printing apparatus (e.g., a duplicator, a facsimile machine, and a printer). The electrophotography comprises digitizing an image to be copied, applying a laser beam to a photoconductor (or a photoreceptor) in response to the digital signal to form an electrostatic latent image on the photoconductor, and then developing the latent image using charged toner. For the electrophotographic apparatus, various roll brushes or bar brushes are used. As the fiber constituting these brushes, fibers having characteristics according to the purposes are used. Into the electrophotographic apparatus, for example, the following brushes are incorporated: a brush for applying a solid lubricant (such as zinc stearate) to easily remove a toner from a photoconductor; a cleaning brush for physically or electrostatically removing a residual toner after printing in a photoconductor, a charge roller, a transfer roller, or a transfer belt; a charging brush for applying a voltage on a toner to charge the toner either of positive or negative; a static removal brush for removing an electrostatic charge from a charged body; and others. Among these brushes, an electro-conductive brush (e.g., a cleaning brush, a charging brush, and a static removal brush) requires a specified electric conductivity. In particular, the cleaning brush usually requires a stable resistance value of the order of $10^9$ Ω/cm.

As an electro-conductive fiber for the electro-conductive brush, various electro-conductive fibers have been reported. For example, for the cleaning brush, an electro-conductive fiber in which an electro-conductive agent is added to a regenerated fiber (such as a viscose rayon fiber) or a synthetic fiber (e.g., a polyamide fiber, a polyester fiber, an acrylic fiber, and a polypropylene fiber) is used.

Moreover, a duplicator or a printer is now tending to be downsized and speeded up. In addition, there is a tendency to make a particle size of a toner smaller. In order to suit these tendencies, improvement in various brushes is also required. In particular, the cleaning brush is required to show more uniform electric resistance value and to contain a thinner filament as a single filament of a constitute fiber thereof. At the same time, the cleaning brush also requires a high durability (e.g., less settling and less variable electric resistance value).

As an example of a production of a fiber by mixing an electro-conductive carbon into a synthetic resin, for example, Japanese Patent Application Laid-Open Publication No. 2007-247095 (JP-2007-247095A, Patent Document 1) discloses a conductive polyester fiber which comprises a multifilament yarn composed of a plurality of single filaments of a polyester resin, wherein the single filaments contain 15 to 25% by mass of a carbon black having an average particle size of 15 to 40 nm and a DBP oil absorption of 130 to 200 $cm^3/100$ g, and the multifilament has an electric resistance value of $1\times10^4$ to $9\times10^9$ Ω/cm.

Japanese Patent Application Laid-Open Publication No. 2003-306832 (JP-2003-306832A, Patent Document 2) discloses a polyamide multifilament comprising an electro-conductive carbon, the polyamide multifilament containing magnesium in an amount of 8 to 25 mmol in 1 kg of the polyamide multifilament and having a specific resistance value of $10^3$ to $10^8$ Ω/cm.

When each one of these electro-conductive fibers is used to produce an electro-conductive yarn having the order of $10^9$ Ω/cm as required for the cleaning brush, however, there is a large variation in the resistance value among the yarns or in the resistance in the length direction of the yarn. Thus a brush comprising the yarn has an uneven resistance value, which causes unevenness of electrostatic removal of a toner. Further, since each one of these electro-conductive fibers contains an electro-conductive carbon in a polymer of the fiber, the fiber has a low flowability in melt spinning and lack spinnability. There is therefore a variation in the fineness of the single filaments composed of the obtained multifilament, which induces unevenness in the physical removal of the toner. Further, the single filament, which has a large fineness, easily scratches a photoconductor.

In order to make a fiber from a polymer containing an electro-conductive carbon mixed thereinto and having a low spinnability, a method which comprises forming the polymer and a polymer having a high spinnability into a conjugated fiber has also been reported. For example, Japanese Patent Application Laid-Open Publication No. 2006-9177 (JP-2006-9177A, Patent Document 3) discloses an electro-conductive conjugated fiber having a cross section which comprises a component A comprising a polymer containing an electro-conductive carbon and a component B comprising a polymer incompatible with the component A, wherein the component A is divided to a plurality of segments by the component B. This document discloses a conjugated fiber in which a core comprising the component B and having a 3- to 10-pointed star-shaped cross section is covered with the component A. The fineness of the component B segment is 3 to 7 dtex.

Japanese Patent Application Laid-Open Publication No. 2008-196073 (JP-2008-196073A, Patent Document 4) discloses a conductive conjugated fiber; the conductive conjugated fiber comprises a non-conductive component composed of a polyester resin and a conductive component composed of a polylactic acid containing 10 to 25% by mass of a carbon black having an average particle size of 15 to 35 nm and a DBP absorption of 40 to 150 $cm^3/100$ g, exhibits that at least part of the conductive component is exposed to the surface of the fiber, and has an electric resistance value of $1\times10^9$ Ω/cm to $9\times10^{12}$ Ω/cm. In Examples of this document, a conductive conjugated fiber having a fineness of 28 dtex/2 filaments is obtained.

For each one of these electro-conductive conjugated fibers, however, even if the fineness of the single filament is smaller, the fineness limit of the conjugated fiber is 3 dtex. It is substantially difficult to produce a conjugated fiber having a fineness smaller than 3 dtex. Further, the problem of the large variation in the resistance value among the yarns or in the resistance value in the length direction of the yarn in the electro-conductive yarn having the order of $10^9$ Ω/cm required for the cleaning brush also arises for the conjugated fiber.

RELATED ART DOCUMENTS

Patent Documents

Patent Document 1: JP-2007-247095A (Claim 1)
Patent Document 2: JP-2003-306832A (Claim 1)
Patent Document 3: JP-2006-9177A (Claims, paragraph [0012], FIG. 1)
Patent Document 4: JP-2008-196073A (Claim 1, Examples)

SUMMARY OF THE INVENTION

Problems to be Solved by the Invention

It is therefore an object of the present invention to provide an electro-conductive multifilament yarn having uniform and excellent electro-conductive characteristics (charging or static removal property) as required for an electro-conductive brush (such as a roll brush or a bar brush) for an electrophotographic apparatus, and an electro-conductive brush formed from the electro-conductive multifilament yarn.

Another object of the present invention is to provide an electro-conductive multifilament yarn for highly physically and electrostatically removing a toner having a small particle size even in a small-sized and high-speed electrophotographic apparatus, and an electro-conductive brush formed from the electro-conductive multifilament yarn.

It is still another object of the present invention to provide an electro-conductive multifilament yarn which can prevent deterioration in electro-conductivity even in use as an electro-conductive brush for an electrophotographic apparatus for a long period of time, and an electro-conductive brush formed from the electro-conductive multifilament yarn.

Means to Solve the Problems

The inventors of the present invention made extensive studies and finally found that use of an electro-conductive multifilament yarn which comprises an electro-conductive fiber containing a synthetic fiber having a surface covered with a carbon nanotube as an electro-conductive brush allows uniform or excellent electro-conductive characteristics as required for an electro-conductive brush (a cleaning brush for a photoconductor) for an electrophotographic apparatus. The present invention was accomplished based on the above findings.

That is, the electro-conductive multifilament yarn of the present invention is an electro-conductive multifilament yarn for forming an electro-conductive brush and comprises an electro-conductive fiber; the electro-conductive fiber contains a synthetic fiber and a carbon nanotube covering a surface of the synthetic fiber. The multifilament yarn may have a single-filament fineness of not more than 30 dtex. The electro-conductive fiber may comprise the synthetic fiber and an electro-conductive layer covering a surface of the synthetic fiber and containing the carbon nanotube, and the synthetic fiber may be covered with the electro-conductive layer in a coverage of not less than 90%. The synthetic fiber may have a plurality of (particularly, 3 to 6) elongated recesses or grooves extending in a longitudinal (or threadline) direction thereof. The synthetic fiber may have a multi-leaves or star-shaped cross-section. The synthetic fiber may comprise a single-phase non-conjugated fiber comprising a synthetic resin. The synthetic fibermay comprise at least one member selected from the group consisting of a polyester-series resin, a polyamide-series resin, a polyolefin-series resin, and an acryl-series resin. The electro-conductive multifilament yarn of the present invention may be a multifilament yarn obtainable by immersing the multifilament yarn comprising the synthetic fiber in a dispersion containing the carbon nanotube while vibrating the multifilament yarn to allow the carbon nanotube to adhere to the surface of the synthetic fiber and form an electro-conductive layer. In the electro-conductive multifilament yarn of the present invention, the ratio of the carbon nanotube may be about 0.1 to 5 parts by mass relative to 100 parts by mass of the synthetic fiber. The electro-conductive multifilament yarn of the present invention has a high electro-conductivity. The yarn may have an electric resistance value of $1\times10^{6}$ to $1\times10^{11}$ Ω/cm at 20° C. Further, the electro-conductivity is highly uniform; the standard deviation of a logarithm of an electric resistance value may be not more than 1.0 in measurements of not less than 10 pieces extracted in a longitudinal direction of the yarn.

The present invention also includes an electro-conductive brush comprising (or formed from) the electro-conductive multifilament yarn. The electro-conductive brush may comprise (or be formed from) a pile fabric containing the electro-conductive multifilament yarn as a cut-pile yarn. The electro-conductive brush is suitable as a cleaning brush for an electrophotographic apparatus. The electric resistance value of the cleaning brush after printing 250,000 times using an electrophotographic printer may be about 1 to 10 times as large as the electric resistance value of the original cleaning brush.

Effects of the Invention

According to the present invention, since the electro-conductive multifilament yarn comprises an electro-conductive fiber in which a surface of a synthetic fiber is covered with a carbon nanotube, the electro-conductive multifilament yarn has uniform and excellent electro-conductive characteristics as required for an electro-conductive brush for an electrophotographic apparatus. Moreover, when the electro-conductive multifilament yarn comprises a multifilament yarn having a small single-filament fineness, the yarn can highly physically and electrostatically remove a toner having a small particle size due to a uniform and thin single-filament diameter thereof and a uniform and high electro-conductivity thereof even in a small-sized and high-speed electrophotographic apparatus. Further, even if an electro-conductive brush (for example, a cleaning brush for photoconductor) comprising the electro-conductive multifilament yarn is used in an electrophotographic apparatus for a long period of time, the deterioration in electro-conductivity can be prevented.

BRIEF DESCRIPTION OF DRAWINGS

FIG. 1 is an optical microphotograph of an electro-conductive multifilament yarn obtained in Example 1.

DESCRIPTION OF EMBODIMENTS

[Electro-conductive Multifilament Yarn]

The electro-conductive multifilament yarn of the present invention is an electro-conductive multifilament yarn for forming an electro-conductive brush. The electro-conductive multifilament yarn comprises an electro-conductive fiber that is a synthetic fiber having a surface covered with a carbon nanotube. The carbon nanotube, which covers the synthetic fiber, usually forms an electro-conductive layer.

(Synthetic Fiber)

The synthetic fiber is a fiber formed from a fiber-formable (or fiber-forming) synthetic resin or synthetic polymer material (synthetic organic polymer). The synthetic fiber may be formed from one species of a synthetic organic polymer (hereinafter, the synthetic organic polymer may simply be referred to as a "polymer") or may be formed from two or more species of polymers. The synthetic resin is not particularly limited to a specific one and may include, for example, a polyester resin [e.g., an aromatic polyester resin (e.g., a poly(alkylene arylate) resin such as a poly(ethylene terephthalate), a poly(trimethylene terephthalate), a poly(butylene terephthalate), or a poly(hexamethylene terephthalate); a fully aromatic polyester resin such as a polyarylate; and a liquid crystal polyester resin), and an aliphatic polyester resin (e.g., an aliphatic polyester and a copolymer thereof, such as a polylactic acid, a poly(ethylene succinate), a poly(butylene succinate), a poly(butylene succinate adipate), a hydroxybutylate-hydroxyvalerate copolymer, or a polycaprolactone)], a polyamide resin (e.g., an aliphatic polyamide and a copolymer thereof, such as a polyamide 6, a polyamide 66, a polyamide 610, a polyamide 10, a polyamide 12, or a polyamide 612; an alicyclic polyamide; and an aromatic polyamide), a polyolefin (or polyolefinic) resin (e.g., polyolefin and a copolymer thereof, such as a polypropylene, a polyethylene, an ethylene-propylene copolymer, a polybutene, or a polymethylpentene), an acrylic polymer (e.g., an acrylonitrile resin having an acrylonitrile unit, such as an acrylonitrile-vinyl chloride copolymer), a polyurethane resin (e.g., a polyester-based, polyether-based, or polycarbonate-based polyurethane resin), a polyvinyl alcohol polymer (e.g., a polyvinyl alcohol and an ethylene-vinyl alcohol copolymer), a polyvinylidene chloride resin (e.g., a polyvinylidene chloride, a vinylidene chloride-vinyl chloride copolymer, and a vinylidene chloride-vinyl acetate copolymer), and a polyvinyl chloride resin (e.g., a polyvinyl chloride, a vinyl chloride-vinyl acetate copolymer, and a vinyl chloride-acrylonitrile copolymer). These synthetic resins may be used alone or in combination.

When the synthetic fiber is formed from two or more species of polymers, the synthetic fiber may be blend spinning fibers formed from a mixture (alloy resin) of two or more species of polymers or may be a composite or multi-phase spinning fibers in which two or more species of polymers form a plurality of phase separation structure. The structure of the composite or multi-phase spinning fiber may include, for example, an islands-in-the-sea structure, a sheath-core structure, aside-by-side laminated structure, a structure comprising an islands-in-the-sea structure and a sheath-core structure in combination, and a structure comprising a side-by-side laminated structure and an islands-in-the-sea structure in combination.

Among these synthetic fibers, fibers comprising the polyester resin, the polyamide resin, the polyolefin resin, the acrylic polymer, or the like are preferred in the respect that such fibers have an excellent adhesive property (or adhesiveness) to the carbon nanotube and an excellent bending durability. In particular, in view of wide use and thermal property, the preferred fibers include fibers comprising the polyester resin [particularly, a poly($C_{2-4}$alkylene terephthalate) resin (e.g., a poly(ethylene terephthalate) and a poly(butylene terephthalate))], the polyamide resin (particularly, an aliphatic polyamide resin such as a polyamide 6 or a polyamide 66), or the polyolefin resin (particularly, a polypropylene resin such as a polypropylene). In particular, the polyester fiber is preferable in the respect that the fiber has excellent thermal stability and dimensional stability. Moreover, for each purpose, a liquid crystal fiber (e.g., liquid crystal polyester fibers) having a high strength and a high elasticity can suitably be used.

The cross-sectional form of the synthetic fiber is not particularly limited to a specific one. The synthetic fiber may be a common synthetic fiber having a circular cross section or a synthetic fiber having a modified (or deformed) cross section other than a circular cross section. For the fiber having a modified cross section, the cross-sectional form may be, for example, a square form, a polygonal form, a triangular form, a hollow form, a flat form, a multi-leaves or star-shaped (or astral) form, a dog-bone form (I-shaped form), a T-shaped form, and a V-shaped form. Among these forms, in the respect that the adhesion to the carbon nanotube by friction can be improved to prevent peeling off of the carbon nanotube, the preferred form includes a cross-sectional form having a plurality of (for example, about 2 to 10, preferably about 3 to 6) elongated recesses or grooves extending in a longitudinal direction of the fiber, for example, a multi-leaves or star-shaped (for example, 3- to 6-leaves (or 3- to 6-pointed)) form. The multi-leaves or star-shaped form may be a form having a plurality of recesses, each positioned in symmetry with respect to the center of the cross section (for example, a four-leaves (or four-pointed) form or a cross-shaped form). For a form having recesses or grooves, the average depth of each recess or groove may for example be about 0.01 to 0.5 times, preferably about 0.03 to 0.4 times, and more preferably about 0.05 to 0.3 times (particularly about 0.1 to 0.3 times) as large as the fiber diameter (a diameter of a virtual circle having no recess or groove).

(Multifilament Yarn)

In the electro-conductive multifilament yarn of the present invention, the synthetic fiber forms a multifilament yarn. The multifilament yarn may be a processed multifilament yarn. Further, in order to obtain an intended fineness, a plurality of multifilament yarns may be combined. When a plurality of multifilament yarns is combined, these yarns may be combined after covering the synthetic fiber with the carbon nanotube.

For the cleaning brush, in order to physically remove a fine toner more efficiently, it is sufficient that the single-filament fineness (average single-filament fineness) is not more than 30 dtex (e.g., about 0.1 to 30 dtex). The single-filament fineness may be preferably about 0.5 to 20 dtex and more preferably about 1 to 10 dtex. In particular, according to the present invention, in the respect that a toner having a small particle size can be highly physically and electrostatically removed, the single-filament fineness is preferably a fineness as small as not more than 3 dtex, and is, for example, about 0.1 to 3 dtex (e.g., about 0.1 to 2.5 dtex), preferably about 0.3 to 2 dtex, and more preferably about 0.5 to 1.8 dtex (particularly about 0.5 to 1.5 dtex). When the single-filament fineness is excessively large, the fiber in itself has a strong rigidity, so that the brush obtained has a lowered softness and easily scratches a photoconductor. In contrast, when the single-filament fineness is excessively small, the contact pressure to a photoconductor is too low to remove a toner efficiently.

It is sufficient that the number of multifilament yarns is adjusted according to an intended fineness. For example, the number of multifilament yarns is about 10 to 500, preferably about 20 to 400, and more preferably about 30 to 300. In consideration of brushability of a brush formed from the multifilament yarn, it is preferable that there are no or extremely few twists or/and knots in interlacing.

The fineness (average fineness) of the multifilament yarn is not particularly limited to a specific one as far as the multifilament yarn has a fineness suitable for a raised fabric for brush. The fineness of the multifilament yarn may be selected from the range of about 10 to 1000 dtex and is, for example, about 20 to 800 dtex, preferably about 100 to 500 dtex, and more preferably about 150 to 400 dtex.

The single filament constituting the multifilament yarn may contain a non-synthetic fiber as far as an advantage of the present invention is not deteriorated. The non-synthetic fiber may include, for example, a natural fiber (e.g., a cotton, a flax, a wool, and a silk), a regenerated fiber (e.g., a rayon and a cupra), and a semi-synthetic fiber (e.g., an acetate fiber). In order to allow the electro-conductive layer (the carbon nanotube) to adhere to the multifilament yarn excellently, the ratio of the non-synthetic fiber is about not more than 50% by mass (e.g., about 0 to 50% by mass), preferably about not more than 30% by mass, and more preferably about not more than 10% by mass (e.g., about 1 to 10% by mass) relative to the total mass of the multifilament yarn. Moreover, the occupancy area of the non-synthetic fiber is not more than 50% (e.g., about 0 to 50%), preferably not more than 30%, and more preferably not more than 10% relative to the whole surface of the multifilament yarn.

(Carbon Nanotube or Electro-conductive Layer)

According to the present invention, the electro-conductivity can be imparted to the synthetic fiber by covering the surface of the synthetic fiber with the carbon nanotube. The carbon nanotube which covers the synthetic fiber may be called an electro-conductive layer.

In order to exhibit a uniform electric resistance value in an electro-conductive brush comprising the electro-conductive multifilament yarn, the electro-conductive layer (the carbon nanotube) is preferably adhered to part (or a local area) of the surface of the multifilament yarn (that is, the surface of the fiber located in the surface of the multifilament yarn), for example, in a coverage of not less than 60% (e.g., about 60 to 100%), preferably not less than 90% (e.g., about 90 to 100%), and more preferably all (100%) of the whole surface of the multifilament yarn.

On the other hand, it is not always necessary to adhere the electro-conductive layer (particularly, the carbon nanotube) to the surface of the fiber located in the inside of the multifilament yarn (the surface of the fiber which is not exposed to the surface of the yarn). The adhesion of the electro-conductive layer (particularly, the carbon nanotube) to not only the surface of the fiber located in the surface of the yarn but also the surface of the fiber located in the inside of the yarn can reduce the variation of the electric resistance value and improve the durability.

With respect to each single filament constituting the multifilament yarn, it is preferable that the electro-conductive layer (the carbon nanotube) be adhered to the surface of the fiber at a coverage (covering rate) of not less than 50% (e.g., about 50 to 100%), for example, preferably not less than 90% (e.g., about 90 to 100%), and more preferably all (100%) of the whole surface of the single filament (the synthetic fiber).

In order to allow the carbon nanotube to adhere to the inside of the multifilament yarn, it is preferable that the after-mentioned adhesion treatment of the carbon nanotube using vibration (or microvibration) be conducted.

The ratio of the carbon nanotube (the electro-conductive layer) is about 0.1 to 5 parts by mass relative to 100 parts by mass of the synthetic fiber. In particular, in order to impart the electro-conductivity to the synthetic fiber, the proportion of the carbon nanotube is of importance. The adhesion amount (proportion) of the carbon nanotube can be adjusted depending on conditions such as the species of the multifilament yarn, the application, the species of the carbon nanotube, and the concentration of the carbon nanotube dispersion. Generally, the amount of the carbon nanotube is, for example, about 0.1 to 3 parts by mass, preferably about 0.1 to 2 parts by mass, and more preferably about 0.1 to 1 parts by mass (particularly about 0.1 to 0.5 parts by mass) relative to 100 parts by mass of the synthetic fiber. The electro-conductive fiber with the carbon nanotube adhered thereto in such a proportion is preferred in terms of characteristics such as the prevention of peeling off of carbon nanotube from the synthetic fiber and the stability of the electric resistance value.

The adhesion amount (proportion) of the carbon nanotube does not contain the adhesion amount of a surfactant. Even when the carbon nanotube is adhered to the surface of the synthetic fiber by a binder, the adhesion amount (proportion) of the carbon nanotubes means the amount of the carbon nanotube itself and does not contain the adhesion amount of the binder.

The proportion of the carbon nanotube in the electro-conductive layer (the total amount of the electro-conductive layer containing the binder and the surfactant) may for example be about 15 to 70% by mass, preferably about 20 to 60% by mass, and more preferably about 25 to 60% by mass (particularly about 30 to 60% by mass).

Further, in the electro-conductive fiber, the electro-conductive layer having a uniform thickness is adhered to the surface of the synthetic fiber. For example, the electro-conductive layer in an almost whole surface of the synthetic fiber has a thickness of, for example about 0.1 to 5 μm, preferably about 0.2 to 4 μm, and more preferably about 0.3 to 3 μm. The electro-conductive fiber, which has such a uniform electro-conductive layer, is preferred in the respect that the peeling off of the carbon nanotube is prevented and that the uniformity of the electric resistance value is obtained. In order to control the thickness, as described later, the multifilament yarn (synthetic fiber) may be vibrated (or microvibrated) while treating the multifilament yarn with the dispersion. Thus, the dispersion is permeated into the inside of a bundle of the multifilament yarn, and a uniform resin layer can be formed over the whole surface of every single filament of the multifilament yarn. Thus, as described above, the carbon nanotube content of the electro-conductive layer can be increased compared with kneading of the carbon nanotube.

The electro-conductivity suited to the purposes can be imparted to the synthetic fiber by adhering the carbon nanotube to the surface of the synthetic fiber within the ranges of above-mentioned amount and thickness. The electro-conductive multifilament yarn at 20° C. has an electric resistance value of, for example, about $1\times10^6$ to $1\times10^{11}$ Ω/cm, preferably about $1\times10^7$ to $5\times10^{10}$ μm, and more preferably $1\times10^8$ to $5\times10^9$ about Ω/cm in the light of the electro-conductivity as required for an electrophotographic apparatus. For the cleaning brush, an excessively large resistance value decreases the electrostatic removal of a toner in loading an impressed voltage to the brush. On the other hand, an excessively small resistance value is not preferable because the photoconductor of the electrophotographic apparatus is affected by introduction of electric current. Moreover, the standard deviation of the logarithm of the resistance value (for example, the deviation of measurements of not less than 10 pieces extracted in a longitudinal direction (or threadline direction)) is not more than 1.0 (for example, about 0.01 to 1, preferably about 0.05 to 0.5, and more preferably about 0.1 to 0.3), and a stable electro-conductive performance having less-scattered deviation in a longitudinal direction (or threadline direction) can be imparted to the fiber.

The characteristic structure of the carbon nanotube is a tube structure having a diameter of several nanometers formed by wrapping a single sheet (or a one-atom-thick layer)

of graphite having arranged 6-membered carbon rings (a graphene sheet) into a cylinder. The structure of the graphene sheet having the arranged 6-membered carbon rings may include various structures such as an armchair structure, a zigzag structure, and a chiral (spiral) structure. The graphene sheet may be a single sheet of graphite having a structure formed by a combination of a 6-membered carbon ring with a 5-membered carbon ring or a 7-membered carbon ring. As the carbon nanotube, various carbon nanotubes, for example, a single-walled carbon nanotube comprising a single sheet of graphite, and a multi-walled carbon nanotube having a plurality of the above-mentioned cylindrical sheets arranged in a concentric configuration (a multi-walled carbon nanotube in which at least one carbon nanotube having a smaller diameter is in the inner side of a carbon nanotube having a larger diameter), a carbon nanocone in which an end of a single-walled carbon nanotube is closed to form a circular cone, and a carbon nanotube having a fullerene in an inner side thereof are known. These carbon nanotubes may be used alone or in combination.

Among these carbon nanotubes, in order to improve the strength of the carbon nanotube itself, the multi-walled carbon nanotube is preferred. Moreover, in terms of electro-conductivity, the structure of graphene sheet is preferably an armchair structure.

The production process of the carbon nanotube to be used in the present invention is not particularly limited to a specific one, and the carbon nanotube may be produced according to a conventional method.

Specifically, according to a chemical vapor deposition, the carbon nanotube may be produced by heating a carbon-containing raw material [e.g., a hydrocarbon (such as benzene, toluene, or xylene), carbon monoxide, and an alcohol (such as ethanol)] in the presence of a catalyst [for example, a mixture of a transition metal compound (e.g., a transition metal (such as iron, cobalt, or molybdenum), ferrocene, and an acetate of the metal) and sulfur or a sulfur compound (such as thiophene or iron sulfide)]. That is, a fine fibrous (tubular) carbon is produced by heating the carbon-containing raw material and the catalyst to a temperature of not lower than 300° C. (for example, about 300 to 1000° C.) in gas [e.g., an inert gas (such as argon, helium, or xenon), and hydrogen] for gasification, introducing the resulting matter into a furnace, and further heating the resulting matter at a constant temperature within a range of 800 to 1300° C. (preferably 1000 to 1300° C.) to give a particulate of the catalyst metal and decompose the hydrocarbon. The resulting fibrous carbon has a low purity due to the presence of an unreacted raw material, a non-fibrous carbide, a tar, and the catalyst metal, and also has a low crystallinity. Accordingly, it is preferable that the resulting fibrous carbon be treated in a heat treating furnace in which a temperature (preferably a constant temperature) is maintained within a range of 800 to 1200° C. to remove a volatile component (such as the unreacted raw material or the tar). Further, in order to further promote a formation of a multi-walled structure of carbon nanotube and evaporate the catalyst metal contained in carbon nanotube, the fine fibrous carbon is annealed at a temperature of 2400 to 3000° C. to give carbon nanotube.

The average diameter of the carbon nanotube (a diameter in a direction perpendicular to an axial direction of the carbon nanotube, or a diameter of a cross section of the carbon nanotube) may be, for example, selected from about 0.5 nm to 1 μm (e.g., about 0.5 to 500 nm, preferably about 0.6 to 300 nm, more preferably about 0.8 to 100 nm, and particularly about 1 to 80 nm). For the single-walled carbon nanotube, the average diameter is, for example, about 0.5 to 10 nm, preferably about 0.7 to 8 nm, and more preferably about 1 to 5 nm. For the multi-walled carbon nanotube, the average diameter is, for example, about 5 to 300 nm, preferably 10 to 100 nm, and preferably 20 to 80 nm. The average length of the carbon nanotube is, for example, about 1 to 1000 μm, preferably about 5 to 500 μm, and more preferably about 10 to 300 μm (particularly about 20 to 100 μm).

The electro-conductive layer may contain a surfactant which is contained in a dispersion used in the production step. As the surfactant, a zwitterionic (amphoteric) surfactant, an anionic surfactant, a cationic surfactant, or a nonionic surfactant may be used.

The zwitterionic surfactant may include various compounds such as a sulfobetaine compound, a phosphobetaine compound, a carboxybetaine compound, an imidazolium betaine compound, and an alkylamine oxide compound.

Examples of the sulfobetaine compound may include a salt of a di$C_{1-4}$alkyl$C_{8-24}$alkylammonio$C_{1-6}$alkanesulfonic acid (sulfonate) [e.g., 3-(dimethylstearylammonio)propanesulfonate, 3-(dimethylmyristylammonio)propanesulfonate, 3-(dimethyl-n-dodecylammonio)propanesulfonate, and 3-(dimethyl-n-hexadecylammonio)propanesulfonate], and an alkylammonio$C_{1-6}$alkanesulfonate having a steroid skeleton [e.g., 3-[(3-cholamidopropyl)dimethylammonio]-1-propanesulfonate (CHAPS) and 3-[(3-cholamidopropyl) dimethylammonio]-2-hydroxypropanesulfonate (CHAPSO)].

The phosphobetaine compound may include, for example, a $C_{8-24}$alkylphosphocholine (e.g., n-octylphosphocholine, n-dodecylphosphocholine, n-tetradecylphosphocholine, and n-hexadecylphosphocholine), a glycerophospholipid (e.g., lecithin), and a polymer of 2-methacryloyloxyethylphosphorylcholine.

Examples of the carboxybetaine compound may include a di$C_{1-4}$alkyl$C_{8-24}$alkylbetaine (e.g., dimethyllaurylcarboxybetaine) and a perfluoroalkylbetaine. The imidazolium betaine compound may include, for example, a $C_{8-24}$alkylimidazolium betaine such as laurylimidazolium betaine. The alkylamine oxide may include, for example, an amine oxide having a tri$C_{8-24}$alkyl group, such as lauryldimethylamine oxide.

These zwitterionic surfactants may be used alone or in combination. In the zwitterionic surfactant, the salt may include a salt with a substance such as ammonia, an amine compound (e.g., amine, and an alkanolamine such as ethanolamine), an alkali metal (e.g., sodium, and potassium), or an alkaline earth metal (e.g., calcium).

The anionic surfactant may include, for example, an alkylbenzenesulfonate (e.g., a $C_{6-24}$alkylbenzenesulfonate such as sodium laurylbenzenesulfonate), an alkylnaphthalenesulfonate (e.g., a di$C_{3-8}$alkylnaphthalenesulfonate such as sodium diisopropylnaphthalenesulfonate), an alkylsulfonate (e.g., a $C_{6-24}$alkylsulfonate such as sodium dodecanesulfonate), a dialkyl sulfosuccinate (e.g., a di$C_{6-24}$alkyl sulfosuccinate such as sodium di-2-ethylhexyl sulfosuccinate), an alkylsulfate (e.g., a sulfated fat, a salt of a $C_{6-24}$alkylsulfuric acid (such as a sodium salt of an ester of a reduced alcohol of palm oil with sulfuric acid), and a polyoxyethylene alkyl ether sulfate (where the average mole number of adducted oxyethylene units is about 2 to 3 mol)), and an alkylphosphate (e.g., a mono- to tri-$C_{8-18}$alkyl ester of a phosphoric acid such as mono- to tri-lauryl ether phosphoric acid, a polyoxyethylene alkyl ether phosphate). These anionic surfactants may be used alone or in combination. As the salt, the same salts as those of the above-mentioned zwitterionic surfactant may be exemplified.

Examples of the cationic surfactant may include a tetraalkylammonium salt (e.g., a mono- or di$C_{8-24}$alkyl-tri- or dimethylammonium salt such as lauryltrimethylammonium chloride or dioctadecyldimethylammonium chloride), a trialkylbenzylammonium salt [e.g., a $C_{8-24}$alkylbenzyldimethylammonium salt such as cetylbenzyldimethylammonium chloride (e.g., benzalkonium chloride)], and an alkylpyridinium salt (e.g., a $C_{8-24}$alkylpyridinium salt such as cetylpyridinium bromide). These cationic surfactants may be used alone or in combination. The salt may include a salt with a substance such as a halogen atom (e.g., a chlorine atom and a bromine atom) or perchloric acid.

The nonionic surfactant may include, for example, a polyoxyethylene alkyl ether (e.g., a polyoxyethylene $C_{6-24}$alkyl ether such as a polyoxyethylene octyl ether, a polyoxyethylene lauryl ether, or a polyoxyethylene cetyl ether), a polyoxyethylene alkyl phenyl ether (e.g., a polyoxyethylene $C_{6-18}$alkyl phenyl ether such as a polyoxyethylene octyl phenyl ether or a polyoxyethylene nonyl phenyl ether), a polyoxyethylene polyhydric alcohol fatty acid partial ester [e.g., a polyoxyethylene glycerin $C_{8-24}$fatty acid ester such as a polyoxyethylene glycerin stearic acid ester, a polyoxyethylene sorbitan $C_{8-24}$fatty acid ester such as a polyoxyethylene sorbitan stearic acid ester, and a polyoxyethylene sucrose $C_{8-24}$fatty acid ester], and a polyglycerin fatty acid ester (e.g., a polyglycerin $C_{8-24}$fatty acid ester such as a polyglycerin monostearic acid ester). These nonionic surfactants may be used alone or in combination. In the nonionic surfactant, the average mole number of adducted ethylene oxide units is about 1 to 35 mol, preferably about 2 to 30 mol, and more preferably about 5 to 20 mol.

Among these surfactants, as the surfactant contained in the dispersion used in the production step, either combination use of the anionic surfactant and the cationic surfactant or use of the zwitterionic surfactant alone is preferred in order to prevent cohesion and bundle formation due to Van der Waals' force between carbon nanotube molecules and disperse the carbon nanotube in a dispersion medium (e.g., water) stably and finely. In particular, the zwitterionic surfactant is preferably used. Thus, when the synthetic fiber is treated in the presence of the zwitterionic surfactant with the dispersion having the carbon nanotube dispersed therein, the carbon nanotubes can homogeneously or equably be adhered to the surface of the fiber.

As the zwitterionic surfactant, any zwitterionic surfactant as specifically listed above can be used. Among them, a sulfobetaine compound, particularly, a di$C_{1-4}$alkyl$C_{8-24}$alkylammonio$C_{1-6}$alkanesulfonate (such as 3-(dimethylstearylammonio)propanesulfonate or 3-(dimethylmyristylammonio)propanesulfonate) is preferred.

The ratio of the surfactant is, for example, about 0.01 to 100 parts by mass, preferably about 0.03 to 50 parts by mass, and more preferably about 0.05 to 30 parts by mass (particularly about 0.1 to 20 parts by mass) relative to 100 parts by mass of the carbon nanotube. When the ratio of the surfactant is in this range, the electro-conductive layer has an improved uniformity of the carbon nanotube and a maintained high electro-conductivity.

The electro-conductive layer may further contain a hydrate (a hydration stabilizer) in addition to the surfactant. In the dispersion used in the production step of the electro-conductive fiber, the hydration stabilizer contributes to promote the dissolution of the surfactant in a liquid medium (e.g., water) in order that the surface activity of the surfactant be sufficiently effective and to maintain the dispersion state until the carbon nanotube as an electro-conductive layer is fixed on the surface of the fiber.

The species of the hydration stabilizer may depend on conditions such as the species of the surfactant and the species of the liquid medium (dispersion medium). When water is used as the liquid medium, for example, a compound such as the above-mentioned nonionic surfactant (when the nonionic surfactant is used as the surfactant) or a hydrophilic compound (water-soluble compound) may be used as the hydration stabilizer.

Examples of the hydrophilic compound (water-soluble compound) may include a polyhydric alcohol (e.g., glycerin, trimethylolpropane, trimethylolethane, pentaerythritol, sorbitol, xylitol, erythritol, and sucrose), a poly(alkylene glycol) resin (e.g., a poly($C_{2-4}$alkylene oxide) such as a poly(ethylene oxide) or a poly(propylene oxide)), a polyvinyl resin (e.g., a poly(vinylpyrrolidone), a poly(vinyl ether), a poly(vinyl alcohol), and a poly(vinyl acetal)), a water-soluble polysaccharide (e.g., carrageenan, and alginic acid or a salt thereof), a cellulose resin (e.g., an alkylcellulose such as a methylcellulose, a hydroxy$C_{2-4}$alkylcellulose such as a hydroxyethylcellulose or a hydroxypropylmethylcellulose, and a carboxy$C_{1-3}$alkylcellulose or a salt thereof, such as a carboxymethylcellulose), and a water-soluble protein (e.g., gelatin).

These hydration stabilizers may be used alone or in combination. Among these hydration stabilizers, the polyhydric alcohol such as glycerin is widely used.

The ratio of the hydration stabilizer is, for example, about 0.01 to 500 parts by mass, preferably about 1 to 400 parts by mass, and more preferably about 10 to 300 parts by mass relative to 100 parts by mass of the surfactant.

The electro-conductive layer may further contain a binder in addition to the surfactant. The binder improves the adhesiveness of the carbon nanotube to the synthetic fiber.

The binder may include a conventional adhesive resin, for example, a polyolefin resin, an acrylic resin, a vinyl acetate resin, a polyester resin, a polyamide resin, and a polyurethane resin. These adhesive resins may be used alone or in combination.

When water is used as the dispersion medium, among these binders, a hydrophilic adhesive resin (for example, an aqueous polyester resin, an aqueous acrylic resin, and a vinyl acetate resin) is preferred.

As the aqueous polyester resin to be used, there may be a polyester resin obtainable (or obtained) by a reaction of a dicarboxylic acid component (e.g., an aromatic dicarboxylic acid such as terephthalic acid, and an aliphatic dicarboxylic acid such as adipic acid) with a diol component (e.g., an alkanediol such as ethylene glycol or 1,4-butanediol), wherein the polyester resin has a hydrophilic group introduced thereto. The method for introducing the hydrophilic group may include, for example, a method using a dicarboxylic acid component having a hydrophilic group (such as a sulfonate group or a carboxylate group) as the dicarboxylic acid component (e.g., 5-sodium sulfoisophthalate, and a polycarboxylic acid having three or more carboxyl groups), and a method using a poly(ethylene glycol) or a dihydroxycarboxylic acid as the diol component.

The aqueous acrylic resin may include, for example, a poly((meth)acrylic acid) or a salt thereof, a (meth)acrylic acid-(meth)acrylate copolymer, a (meth)acrylic acid-styrene-(meth)acrylate copolymer, a (meth)acrylic acid-vinyl acetate copolymer, a (meth)acrylic acid-vinyl alcohol copolymer, a (meth)acrylic acid-ethylene copolymer, and salts thereof.

The vinyl acetate resin is a polymer containing a vinyl acetate unit, or a saponification product thereof. For example, the vinyl acetate resin may be a poly(vinyl acetate), a (meth) acrylic acid-vinyl acetate copolymer, a vinyl acetate-maleic anhydride copolymer, a vinyl acetate-methyl(meth)acrylate copolymer, an ethylene-vinyl acetate copolymer, a poly(vinyl alcohol), and an ethylene-vinyl alcohol copolymer.

Further, as the binder, it is preferable to use the same type of an adhesive resin as the synthetic fibers. That is, for example, when the polyester resin is used for the synthetic fibers, it is preferable to use the aqueous polyester resin as the binder.

In order to smoothly adhere the carbon nanotubes to the fiber surface without entirely covering the surface of the carbon nanotube with the binder, the ratio of the binder is, for example, about 50 to 400 parts by mass, preferably about 60 to 350 parts by mass, and more preferably about 100 to 300 parts by mass (particularly about 100 to 200 parts by mass) relative to 100 parts by mass of the carbon nanotube.

According to the present invention, since the carbon nanotube is adhered to the surface of the synthetic fiber through a mutual affinity, the binder is not necessarily needed. Even when the binder is not contained, the electro-conductive layer is firmly adhered to the surface of the synthetic fiber. That is, the electro-conductive multifilament yarn may be a multifilament yarn substantially free from the binder.

In particular, when the synthetic fiber comprises the polyester fiber, the carbon nanotube is firmly adhered to the surface of the polyester fiber at a sufficient adhesion strength without the binder due to a high affinity of the polyester fiber and the carbon nanotube. Use of a small amount of the binder further improves the adhesion strength of the carbon nanotube to the surface of the fiber.

The electro-conductive layer may further contain a conventional additive, for example, a surface-treating or finishing agent (e.g., a coupling agent such as a silane coupling agent), a coloring agent (e.g., a dye and a pigment), a color-improving agent, a dye-fixing agent, a brightener (or a brightening agent), a metal-corrosion inhibitor, a stabilizer (e.g., an antioxidant and an ultraviolet ray absorbing agent), a dispersion stabilizer, a thickener or a viscosity controlling agent, a thixotropy-imparting agent, a leveling agent, a defoaming agent, a bactericide, and a filler. These additives may be used alone or in combination.

[Production Process of Electro-conductive Multifilament Yarn]

The electro-conductive multifilament yarn is produced through a step for adhering the electro-conductive layer containing the carbon nanotube to the surface of the synthetic fiber by using the dispersion containing the carbon nanotube, and then a step for drying a multifilament yarn containing the electro-conductive fiber having the electro-conductive layer adhered to a surface thereof.

In the adhesion step of the electro-conductive layer, the concentration of the carbon nanotube in the dispersion is not particularly limited to a specific one. Depending on an intended electric resistance value, the amount of the carbon nanotube relative to the total mass of the dispersion may suitably be selected from the range of 0.1 to 30% by mass (particularly 0.1 to 10% by mass). Also when the binder is used, the amount of the carbon nanotube may be selected from such a range in order that the ratio of the binder relative to the carbon nanotube may be a desired value.

The dispersion medium (liquid medium) for dispersing the carbon nanotube may include, for example, a conventional polar solvent (e.g., water, an alcohol, an amide, a cyclic ether, and a ketone), a conventional hydrophobic solvent (e.g., an aliphatic or aromatic hydrocarbon, and an aliphatic ketone), or a mixed solvent thereof. Among these solvents, water is preferably used in terms of convenience (or simplicity) or operationality.

Moreover, in order to stably disperse the carbon nanotube in the liquid medium (e.g., water) without cohesion (or aggregation), it is preferable that the carbon nanotube dispersion used for the treatment contain the above-mentioned surfactant. The amount of the surfactant may be selected, for example, from the range of about 1 to 100 parts by mass (particularly about 5 to 50 parts by mass) relative to 100 parts by mass of the carbon nanotube.

In the case of the carbon nanotube dispersion containing the surfactant (particularly the zwitterionic surfactant), in order to promote the dissolution of the surfactant to the liquid medium (e.g., water) and exhibit the surface activity sufficiently, it is preferable that a hydrate (hydration stabilizer) be added to the dispersion.

The amount (or ratio) of the hydration stabilizer may be selected from the range of about 10 to 500 parts by mass (particularly about 50 to 300 parts by mass) relative to 100 parts by mass of the surfactant.

The method of preparing the dispersion is not particularly limited to a specific one, and any method may be used as long as the a dispersion in which the carbon nanotube is stably and finely dispersed in the liquid medium (e.g., water) can be prepared without causing cohesion (or aggregation) or bundle formation of the carbon nanotube.

In particular, according to the present invention, the preferred preparation method includes a method comprising dispersion-treating the carbon nanotube in an aqueous medium (water) in the presence of the surfactant (particularly the zwitterionic surfactant) while holding the pH of the aqueous medium to 4.0 to 8.0, preferably 4.5 to 7.5, and more preferably 5.0 to 7.0. The dispersion treatment in this preparation method preferably uses a mill (a media mill) using a medium as a dispersion apparatus. Concrete examples of the media mill include a bead mill, and a ball mill. In the case of the bead mill, a bead (e.g., a zirconia bead) having a diameter of 0.1 to 10 mm and preferably 0.1 to 1.5 mm is preferably used. In particular, the dispersion may be prepared as follows: a carbon nanotube and a surfactant (and optionally a component such as a binder) are pre-mixed or pre-dispersed in an aqueous medium using a ball mill to obtain a paste product, and then the paste product and another aqueous medium containing a surfactant are added in a bead mill to give a dispersion.

In the dispersion obtained by this preparation method, the carbon nanotube is stably dispersed in a finely dispersed state in the aqueous medium without causing cohesion (or aggregation) and bundle formation due to Van der Waals' force between carbon nanotube molecules through the agency of the surfactant. The treatment with this dispersion therefore allows uniform adhesion of the carbon nanotube to the surface of the fiber.

The method of treating the multifilament yarn (the synthetic fiber) with the dispersion of the carbon nanotube is not particularly limited to a specific one. Any method may be used as long as the electro-conductive layer containing the carbon nanotube can homogeneously be adhered to the fiber surface of the synthetic fiber. Such a treatment method may include, for example, a method of immersing the multifilament yarn in the dispersion of the carbon nanotube, a method of treating the multifilament yarn with the dispersion of the carbon nanotube using a covering apparatus (or a coating apparatus) (e.g., a sizing apparatus equipped with a touch roller, a doctor blade, a pad, a spray apparatus, and a yarn printing apparatus).

The temperature in the treatment with the dispersion is not particularly limited to a specific one, and may be, for example, selected from the range of about 0 to 150° C. The temperature is preferably about 5 to 100° C., more preferably about 10 to 50° C., and usually an ordinary (or room) temperature.

Among these treatment methods, a method of immersing the synthetic fiber in the dispersion of the carbon nanotube and a yarn printing method are preferred since such a method allows formation of a uniform electro-conductive layer. Further, in the adhesion treatment with the dispersion, it is preferred to vibrate the multifilament yarn containing the synthetic fiber. When the multifilament yarn is treated while giving vibration, the dispersion permeates the inside of the multifilament bundle to form a uniform electro-conductive layer over the inside of the fiber or the whole surface of every single filament constituting the multifilament.

It is sufficient that the frequency of the vibration is, for example, not less than 20 Hz. The frequency is, for example, about 20 to 2000 Hz, preferably about 50 to 1000 Hz, and more preferably about 100 to 500 Hz (particularly about 100 to 300 Hz).

The means for giving vibration is not particularly limited to a specific one, and may include a conventional means, for example, a mechanical means and an ultrasonic means. The mechanical means may be, for example, a method of vibrating the fiber by vibrating a yarn guide for guiding the fiber to an apparatus such as a sizing apparatus or an immersion bath, by vibrating the sizing apparatus itself or the immersion bath itself, or by vibrating the dispersion.

The adhesion treatment with the dispersion may be one-time operation or may comprise repeating the same operation two or more times.

In the drying step, the liquid medium is removed from the multifilament yarn treated with the dispersion of the carbon nanotube, and the resulting matter is dried to obtain the electro-conductive multifilament yarn, in which the carbon nanotube is homogeneously adhered in a state of a thin layer as an electro-conductive layer to the surface of the fiber.

The drying temperature may be selected according to the species of the liquid medium (dispersion medium) in the dispersion. When water is used as the dispersion medium, the drying temperature to be used is usually about 100 to 230° C. (particularly about 110 to 200° C.) depending on the material of the organic fiber. For the polyester fiber, the drying temperature may be, for example, about 120 to 230° C. (particularly about 150 to 200° C.)

[Electro-conductive Brush]

The electro-conductive brush of the present invention is not particularly limited to a specific one as far as the brush comprises a fabric (a woven or knitted fabric) which is formed by weaving or knitting the electro-conductive multifilament yarn and comprises the electro-conductive multifilament yarn located on a surface thereof. In the light of physical and electrostatic removal of a fine toner particle, the fabric preferably includes a pile fabric (a pile woven or knitted fabric) which comprises a base cloth and an electro-conductive multifilament yarn raised as a pile yarn from a surface of the base cloth. In particular, since a pile fabric comprising an electro-conductive multifilament yarn raised as a cut-pile yarn from a surface of a base cloth can form a structure in which a thin single yarn having a fineness of not more than 3 dtex is extended from a root of the cut-pile yarn at a high density of the pile on the surface of the base cloth, the pile fabric easily takes in (or adsorbs) a fine toner particle, so that the toner-removing efficiency can significantly be improved.

The height or number of piles of the pile yarn which comprises the electro-conductive multifilament yarn (the pile density per unit area) can suitably be selected according to the species of the electro-conductive brush, the type of usage, or others. For example, the pile has a height of about 1 to 10 mm, preferably about 2 to 8 mm, and more preferably about 3 to 6 mm. The pile density is, for example, about 5,000 to 1,000,000 pieces/$cm^2$, preferably about 10,000 to 500,000 pieces/$cm^2$, and more preferably about 20,000 to 300,000 pieces/$cm^2$.

The pile existing in the outer surface side of the fabric is preferably a cut pile rather than a looped pile in the respect of uniform brushing, retention, delivery, and others.

The pile fabric (the pile woven or knitted fabric) is not particularly limited to a specific one as far as the pile fabric contains the electro-conductive multifilament yarn as a pile yarn (in particular, a cut-pile yarn). As the pile fabric, a common pile fabric can be used. As a woven fabric for the base cloth, for example, a plane weave fabric (such as a taffeta fabric), a twilled fabric or twill fabric, and a satin fabric may be used. The pile woven fabric specifically includes a moquette, a velvet, and a corduroy. As a knitted fabric for the base cloth, for example, a plain knit fabric, a warp knit fabric, a circular knit fabric, a flat knit fabric, a rib stitch fabric, and an interlock fabric may be used. The pile knitted fabric specifically includes a tricot fabric, a raschel fabric, and a sinker velour.

A ground yarn constituting the base cloth may comprise the synthetic fiber or the non-synthetic fiber as exemplified in the item of the electro-conductive multifilament yarn, or others. The ground yarn widely used includes a polyester fiber, polyamide fiber, and others. The ground yarn may be a monofilament yarn. In terms of the flexibility (softness) of the base cloth, and others, the ground yarn is preferably a multifilament yarn or a spun yarn. The fineness of the ground yarn (in the case of a multifilament yarn, the fineness of the multifilament yarn) is, for example, about 10 to 500 dtex, preferably about 50 to 450 dtex, and more preferably about 100 to 400 dtex. The multifilament is not particularly limited to a specific single-filament fineness and has, for example, about 1 to 50 dtex, preferably about 3 to 30 dtex, and more preferably about 5 to 20 dtex. The number of single filaments constituting the multifilament is, for example, about 10 to 200, preferably about 20 to 150, and more preferably about 30 to 100. A common binder fiber may be used to reinforce the cut-pile electro-conductive multifilament yarn.

The number of yarns per unit area of the pile fabric (the yarn density) (number per $cm^2$) is not particularly limited to a specific one. The number of yarns can be established according to the standards of the single-filament fineness and the fabric. The number of yarns may usually be selected from the range of about 10,000 to 1,000,000 per $cm^2$. In the light of the electro-conductivity, the efficient contact with a toner, and the like, the number of yarns is, for example, be about 5,000 to 1,000,000 per $cm^2$, preferably about 10,000 to 500,000 per $cm^2$, and more preferably about 20,000 to 300,000 per $cm^2$.

The pile fabric has a thickness of, for example, about 0.5 to 10 mm, preferably about 1 to 8 mm, and more preferably about 2 to 5 mm.

The pile fabric can be produced according to a common production process. The cut pile fabric is obtained by cutting a looped pile yarn raised from a surface of a pile fabric. The obtained pile fabric is cut into a tape-shaped (or strip-shaped) form depending on the size of an electrophotographic apparatus. A roll brush can be produced by winding the tape-shaped pile fabric around a metal rod as a core member (for example, winding spirally) and fixing the fabric. A bar brush can be produced by putting the tape-shaped pile fabric on a metal rod and fixing the fabric. The core member usually comprises a rod of a metal such as stainless steel (SUS). The pile fabric may be fixed on the metal rod with an adhesive.

The electro-conductive brush of the present invention has highly sustainable electro-conductive characteristics. Even when the electro-conductive brush is used as a cleaning brush, increase in the electric resistance value due to friction generated by printing can be prevented. For example, even after 250,000 printings using an electrophotographic printer according to the method described in after-mentioned Examples, the electric resistance value of the cleaning brush after printing can kept within the range of 1 to 10 times, preferably 1 to 5 times, and more preferably 1 to 2 times as large as that of the cleaning brush before printing (that is, that of the original cleaning brush). In the description of this application, 250,000 printings using an electrophotographic printer are conducted according to the method described in after-mentioned Examples.

EXAMPLES

The following examples are intended to describe this invention in further detail and should by no means be interpreted as defining the scope of the invention. The methods of measuring or evaluating individual physical properties for the following examples are explained below. Incidentally, "%" indicates "% by mass" unless otherwise stated.

(1) Adhesion Amount of Carbon Nanotube in Fibers Structural Object (Woven Fabric) and Yarn The fineness of an electro-conductive multifilament yarn before adhering a carbon nanotube (the fineness of an original electro-conductive multifilament yarn) was subtracted from the fineness of the electro-conductive multifilament yarn after adhering the carbon nanotube. The resulting difference was divided by the fineness of the original electro-conductive multifilament yarn to give a ratio of the carbon nanotube (or a total ratio of the carbon nanotube and a binder) relative to the electro-conductive multifilament yarn; and the adhesion amount of the carbon nanotube per unit area of the original electro-conductive multifilament yarn was calculated. In the case where the binder was used, the adhesion amount of the carbon nanotube was calculated, taking the ratio of the carbon nanotube and the binder into consideration.

(2) Electric Resistance Value of Synthetic Fiber

Twenty (20) test pieces, each having a length of 10 cm, were cut out from a synthetic fiber (electro-conductive multifilament yarn) every 100 m along a longitudinal direction of the yarn. Each test piece having a length of 10 cm was placed on an electrode box ("SME-8350" manufactured by To a Electronics Ltd.), and a 1000 V voltage was applied between the both ends of the test piece. Each electric resistance value (Ω/cm) of the 20 test pieces was measured under a measurement environment condition of 20° C. and 30% RH using an ohmmeter ("SME-8220" manufactured by Toa Electronics Ltd). The maximum value and the minimum value were excluded from the measured values, and the average value of the remaining 18 test pieces was calculated to give an electric resistance value (Ω/cm) of the yarn.

(3) Standard Deviation of Logarithm of Electric Resistance Value

Regarding each of the 18 data used for the calculation of the average value in the above item (2), the logarithm was calculated, and the standard deviation of the logarithm was determined.

(4) Electric Resistance Value of Brush

Under a measuring environment condition of 20° C. and 30% RH, a metal plate was allowed to contact with a surface of a brush at a nip quantity (intrusion quantity) of 1 mm, and the electric resistance value of the brush was measured by applying a voltage of 500 V between the metal plate and a core member of the brush. The electric resistance value was measured at 10 points while the brush was turned sequentially, and the average of the measurements at 10 points was calculated.

(5) Wearing Test of 250,000 Printings

A roll brush was fixed on a core member to produce a rotatable roll brush. An ABS (acrylonitrile-butadiene-styrene resin) plate was set to the roll brush at a nip quantity of 1 mm, and a blade plate (made from a polycarbonate resin) was set to the roll brush at a nip quantity of 1 mm parallel to the axis of the brush and opposite the ABS plate. The roll brush was rotated at 300 rpm for 153 hours to be subjected to a load corresponding to 250,000 printings, and the degree of friction was examined.

Example 1

(1) Preparation of Aqueous Carbon Nanotube Dispersion:

(i) An aqueous solution of the surfactant (pH 6.5) was prepared by mixing 2.0 g of 3-(dimethylstearylammonio) propanesulfonate (a zwitterionic surfactant), 5 ml of glycerin (a hydration stabilizer), and 495 ml of deionized water.

(ii) In a ball mill body (cylinder type, internal volume=1800 ml, ball diameter=150 mm, and filling amount of ball=3200 g), 500 ml of the aqueous solution of the surfactant obtained in the above step (i) and 30.4 g of carbon nanotube ("BaytubesC150P" manufactured by Bayer) were put, and the mixture was stirred by hand to give a paste product. Then the ball mill body was placed on a rotating stand ("AS ONE" manufactured by ASAHI RIKA SEISAKUSYO, Co., Ltd.), and the paste product was stirred for one hour to give a liquid product containing the carbon nanotube.

(iii) The whole quantity of the liquid product containing the carbon nanotube produced in the above step (ii) was removed from the ball mill body. To the liquid product were added another 500 ml of an aqueous solution of a surfactant prepared in the same manner as in the above step (i), and further added 30.0 g of a binder ("MEIBINDER NS" manufactured by Meisei Chemical Works, Ltd., a polyester binder) in terms of solid contents. The mixture was charged in a bead mill ("DYNO-MILL" manufactured by WAB, cylindrical type, internal volume=2000 ml, 1800 g of zirconia bead having a diameter of 0.6 mm filled therein) and stirred at a rotation frequency of 300 rpm for 60 minutes to prepare an aqueous carbon nanotube dispersion containing the zwitterionic surfactant [carbon nanotube concentration=2.96 w/w %, binder content=2.26 w/w %]. The pH of the aqueous dispersion was maintained at 5.3 to 6.8 during stirring using the bead mill. The concentration of the carbon nanotube was adjusted to 0.16 w/w % by adding distilled water to the aqueous carbon nanotube dispersion.

(2) Adhesion Treatment of Carbon Nanotube to Polyester Textured Yarn:

(i) Using the aqueous carbon nanotube dispersion obtained in the above step (1), the carbon nanotube was adhered to a commercially available polyester textured yarn ("FD84T48" manufactured by Kuraray Trading Co., Ltd., 84 dtex/48 filaments) by a commonly used sizing manner. Specifically, the polyester textured yarn was vibrated at 200 Hz through a vibrated yarn guide throughout immersion of the polyester textured yarn in the dispersion. The yarn was then dried at 170° C. for 2 minutes to give an electro-conductive yarn having the carbon nanotube adhered thereto and having a fineness of 90 dtex. The polyester textured yarn "FD84T48", being a multifilament yarn, comprised a single filament; the single filament had a surface having four recesses, each extending in a longitudinal direction thereof, and had a 4-leaves (cross-shaped) cross-sectional form.

(ii) The adhesion amount of the carbon nanotube to the electro-conductive yarn obtained in the above step (2) was measured according to the above-mentioned method. The adhesion amount was 0.0024 g per gram of the electro-conductive yarn. The electric resistance value was $1.6\times10^9$ Ω/cm, and the standard deviation of the logarithm of the electric resistance value was 0.23.

FIG. 1 shows an observation of the obtained fiber by an optical microscope. As apparent from FIG. 1, it was revealed that the substantially whole surface of the electro-conductive yarn was covered with the carbon nanotube to be black appearance, that an area uncovered with the carbon nanotube was not found substantially, and that the surface coverage of each single filament was 100%. The proportion of the carbon nanotube in the electro-conductive layer was 56.7% by mass.

(3) Production of Brush:

Four pieces of the obtained electro-conductive multifilament yarn were combined to give a pile yarn. A Spun Tetron 40/2 was used as a warp and a Spun Tetron 20/3 was used as a weft; a pile cloth having an electro-conductive yarn density of 50,000 pieces/$cm^2$ was produced by a commonly used weaving machine for pile fabric. A cut pile fabric having a thickness of 4 mm was obtained by cutting the looped pile of the surface of the pile fabric. The cut pile fabric was slit into 12 mm wide. The resulting strip of the cut pile fabric was wound around a SUS rod having a shaft diameter of 6 mm and fixed to give a cleaning brush having a diameter of 14 mm. The electric resistance value of the brush was $1.0\times10^9$Ω. The wearing test of 250,000 printings was performed using the cleaning brush. The electric resistance value of the brush measured after the test was $1.2\times10^9$Ω.

Example 2

A carbon nanotube ("NC7000" manufactured by Nanocyl) was used instead of the carbon nanotube (BaytubesC150P) in Example 1 to prepare an aqueous dispersion. The aqueous dispersion was diluted with distilled water to a concentration of 0.12 w/w %. The resulting aqueous dispersion was used to produce an electro-conductive multifilament yarn in the same manner as Example 1. The adhesion amount of the carbon nanotube was 0.0017 g per gram of the electro-conductive multifilament yarn. The electric resistance value was $2.2\times10^9$ Ω/cm, and the standard deviation of the logarithm of the electric resistance value was 0.15.

After an observation of the electro-conductive multifilament yarn by an optical microscope, it was revealed that the substantially whole surface of the electro-conductive multifilament yarn was covered with the carbon nanotube to be black appearance, that an area uncovered with the carbon nanotube was not found substantially, and that the surface coverage of each single filament was 100%.

Four pieces of the obtained electro-conductive multifilament yarn were combined to give a pile yarn. In the same manner as Example 1, a pile cloth having an electro-conductive yarn density of 50,000 pieces/$cm^2$ was produced by a commonly used weaving machine for pile fabric. A cut pile fabric having a thickness of 4 mm was obtained by cutting the looped pile of the surface of the pile fabric. The cut pile fabric was slit into 12 mm wide. The resulting strip of the cut pile fabric was wound around a SUS rod having a shaft diameter of 6 mm and fixed to give a cleaning brush having a diameter of 14 mm. The electric resistance value of the brush was $1.5\times10^9$Ω. The wearing test of 250,000 printings was performed using the cleaning brush. The electric resistance value of the brush measured after the test was $1.8\times10^9$Ω.

Example 3

A carbon nanotube ("MWNT-7" manufactured by Hodogaya Chemical Co., Ltd.) was used instead of the carbon nanotube (BaytubesC150P) in Example 1 to prepare an aqueous dispersion. The aqueous dispersion was diluted with distilled water to a concentration of 0.20 w/w %. The resulting aqueous dispersion was used to produce an electro-conductive multifilament yarn in the same manner as Example 1. The adhesion amount of the carbon nanotube was 0.0031 g per gram of the electro-conductive multifilament yarn. The electric resistance value was $3.5\times10^9$ Ω/cm, and the standard deviation of the logarithm of the electric resistance value was 0.26.

After an observation of the electro-conductive multifilament yarn by an optical microscope, it was revealed that the substantially whole surface of the electro-conductive multifilament yarn was covered with the carbon nanotube to be black appearance, that an area uncovered with the carbon nanotube was not found substantially, and that the surface coverage of each single filament was 100%.

Four pieces of the obtained electro-conductive multifilament yarn were combined to give a pile yarn. In the same manner as Example 1, a pile cloth having an electro-conductive yarn density of 50,000 pieces/$cm^2$ was produced by a commonly used weaving machine for pile fabric. A cut pile fabric having a thickness of 4 mm was obtained by cutting the looped pile of the surface of the pile fabric. The cut pile fabric was slit into 12 mm wide. The resulting strip of the cut pile fabric was wound around a SUS rod having a shaft diameter of 6 mm and fixed to give a cleaning brush having a diameter of 14 mm. The electric resistance value of the brush was $1.9\times10^9$Ω. The wearing test of 250,000 printings was performed using the cleaning brush. The electric resistance value of the brush measured after the test was $2.8\times10^9$Ω.

Example 4

Using a polyester textured yarn having a circular cross section ("SD84T48" manufactured by Kuraray Trading Co., Ltd., 84 dtex/48 filaments) instead of the polyester textured yarn having the 4-leaves cross-sectional form in Example 1, an electro-conductive multifilament yarn was produced in the same manner as Example 1. The resulting electro-conductive yarn had a fineness of 89 dtex/48 filament (single-filament fineness: 1.85 dtex). The adhesion amount of the carbon nanotube was 0.0021 g per gram of the electro-conductive multifilament yarn. The electric resistance value was $3.2\times10^9$ Ω/cm, and the standard deviation of the logarithm of the electric resistance value was 0.20.

After an observation of the electro-conductive multifilament yarn by an optical microscope, it was revealed that the substantially whole surface of the electro-conductive multifilament yarn was covered with the carbon nanotube to be black appearance, that an area uncovered with the carbon nanotube was not found substantially, and that the surface coverage of each single filament was 100%.

Four pieces of the obtained electro-conductive multifilament yarn were combined to give a pile yarn. In the same manner as Example 1, a pile cloth having an electro-conductive yarn density of 250,000 pieces/$cm^2$ was produced by a commonly used weaving machine for pile fabric. A cut pile fabric having a thickness of 4 mm was obtained by cutting the looped pile of the surface of the pile fabric. The cut pile fabric was slit into 3 cm wide. The resulting strip of the cut pile fabric was wound around a SUS rod having a shaft diameter of 6 mm and fixed to give a cleaning brush having a diameter of 14 mm. The electric resistance value of the brush was $1.8\times10^{9}\Omega$. The wearing test of 250,000 printings was performed using the cleaning brush. The electric resistance value of the brush measured after the test was $5.8\times10^{10}\Omega$.

The results demonstrated that Example 4 had a tendency to significantly increase the resistance value due to friction compared with Example 1. The cause of increase in the resistance is presumably that falling off of the electro-conductive layer in Example 4, which used the polyester textured yarn having the circular cross section, is more than that in Example 1, which used the polyester textured yarn having the 4-leaves cross-sectional form.

Example 5

Using a polyester textured yarn having a fineness of 84 dtex/16 filaments ("SD84T16" manufactured by Kuraray Trading Co., Ltd., a 4-leaves cross-sectional form, a single-filament fineness of 5.3 dtex) instead of the polyester textured yarn having a fineness of 84 dtex/48 filaments in Example 1, an electro-conductive multifilament yarn was produced in the same manner as Example 1. The resulting electro-conductive yarn had a fineness of 86 dtex/16 filament. The adhesion amount of the carbon nanotube was 0.0010 g per gram of the electro-conductive multifilament yarn. The electric resistance value was $6.2\times10^{9}$ Ω/cm, and the standard deviation of the logarithm of the electric resistance value was 0.39.

After an observation of the electro-conductive multifilament yarn by an optical microscope, it was revealed that the substantially whole surface of the electro-conductive multifilament yarn was covered with the carbon nanotube to be black appearance, that an area uncovered with the carbon nanotube was not found substantially, and that the surface coverage of each single filament was 100%.

Four pieces of the obtained electro-conductive multifilament yarn were combined to give a pile yarn. In the same manner as Example 1, a pile cloth having an electro-conductive yarn density of 90,000 pieces/$cm^2$ was produced by a commonly used weaving machine for pile fabric. A cut pile fabric having a thickness of 4 mm was obtained by cutting the looped pile of the surface of the pile fabric. The cut pile fabric was slit into 3 cm wide. The resulting strip of the cut pile fabric was wound around a SUS rod having a shaft diameter of 6 mm and fixed to give a cleaning brush having a diameter of 14 mm. The electric resistance value of the brush was $2.5\times10^{9}\Omega$. The wearing test of 250,000 printings was performed using the cleaning brush. The electric resistance value of the brush measured after the test was $3.5\times10^{10}\Omega$.

The results demonstrated that Example 5 had a tendency to significantly increase the resistance value due to friction compared with Example 1. The cause of increase in the resistance value is presumably that falling off of the electro-conductive layer in Example 5 is more than that in Example 1 due to a larger single-filament fineness and a contact with an object to be contacted at a stronger contact pressure. Further, it is presumed the following: since the yarn with a larger single-filament fineness has a smaller adhesion amount of the carbon nanotube due to a smaller surface area of the filament, the yarn has a larger degree of increase in the resistance value caused by falling off of the electro-conductive layer, compared with the yarn with a smaller single-filament fineness.

INDUSTRIAL APPLICABILITY

The electro-conductive multifilament yarn of the present invention is used for an electro-conductive brush for an electronic or electrical apparatus, for example, an electro-conductive brush equipped with an electrophotographic apparatus [for example, a duplicator (a copying machine), a facsimile machine, and a printer] (e.g., a roll brush or bar brush such as a cleaning brush for photoconductor or the like, a charging brush, or a static removal brush). In particular, since the electro-conductive multifilament yarn has a uniform and thin single-filament diameter and possesses a uniform and high electro-conductivity, the electro-conductive multifilament yarn can highly physically and electrostatically remove a toner having a small particle size even in a small-sized and high-speed electrophotographic apparatus. Thus the electro-conductive multifilament yarn is ideal for a cleaning brush of an electrophotographic apparatus.

The invention claimed is:

1. An electro-conductive multifilament yarn, comprising:
an electro-conductive fiber,
wherein the electro-conductive fiber comprises a synthetic fiber and an electro-conductive layer covering a surface of the synthetic fiber and comprising a carbon nanotube and a surfactant,
wherein the ratio of the surfactant is 0.01 to 100 parts by mass relative to 100 parts by mass of the carbon nanotube, and
the yarn is suitable for an electro-conductive brush.

2. The electro-conductive multifilament yarn according to claim 1, wherein the multifilament yarn has a single-filament fineness of not more than 30 dtex.

3. The electro-conductive multifilament yarn according to claim 1,
wherein
the electro-conductive layer covers at least 90% of the synthetic fiber.

4. The electro-conductive multifilament yarn according to claim 1,
wherein the synthetic fiber has a plurality of elongated recesses or grooves extending in a longitudinal direction thereof.

5. The electro-conductive multifilament yarn according to claim 1,
wherein the synthetic fiber has from 3 to 6 elongated recesses or grooves extending in a longitudinal direction thereof, and
wherein the synthetic fiber has a multi-leaves or star-shaped cross-section.

6. The electro-conductive multifilament yarn according to claim 1,
wherein the synthetic fiber comprises a single-phase non-conjugated fiber comprising a synthetic resin.

7. The electro-conductive multifilament yarn according to claim 1,
wherein the synthetic fiber comprises at least one resin selected from the group consisting of a polyester-series resin, a polyamide-series resin, a polyolefin-series resin, and an acryl-series resin.

8. The electro-conductive multifilament yarn according to claim 1, obtained by a process comprising immersing the synthetic fiber in a dispersion comprising the carbon nanotube while vibrating the synthetic fiber to adhere the carbon nanotube to the surface of the synthetic fiber and to form an electro-conductive layer.

9. The electro-conductive multifilament yarn according to claim 1, wherein a content of the carbon nanotube is from 0.1 to 5 parts by mass relative to 100 parts by mass of the synthetic fiber.

10. The electro-conductive multifilament yarn according to claim 1, wherein the yarn has an electric resistance of from $1\times10^{6}$ to $1\times10^{11}$ Ω/cm at 20° C.

11. The electro-conductive multifilament yarn according to claim 1, wherein a standard deviation of a logarithm of an electric resistance is not more than 1.0 in measurements of not less than 10 pieces extracted in a longitudinal direction of the yarn.

12. An electro-conductive brush comprising the electro-conductive multifilament yarn of claim 1.

13. The electro-conductive brush according to claim 12, comprising:

a pile fabric comprising the electro-conductive multifilament yarn as a cut-pile yarn.

14. The electro-conductive brush according to claim 12, wherein the electro-conductive brush is a cleaning brush suitable for an electrophotographic apparatus.

15. The electro-conductive brush according to claim 14, wherein an electric resistance value of the brush after printing 250,000 times with an electrophotographic printer is from 1 to 10 times as large as an electric resistance of the brush prior to the printing.

16. The electro-conductive multifilament yarn according to claim 2, wherein the multifilament yarn has a single-filament fineness of from 0.5 dtex to 20 dtex.

17. The brush of claim 12, wherein the electro-conductive multifilament yarn comprises from 10 to 500 single filaments.

18. The electro-conductive multifilament yarn according to claim 1, wherein the surfactant is at least one of an amphoteric surfactant, an anionic surfactant and a cationic surfactant.

19. The electro-conductive multifilament yarn according to claim 1, wherein the surfactant is an amphoteric surfactant.

20. The electro-conductive multifilament yarn according to claim 1, wherein the carbon nanotube and the surfactant are present only on the surface of the synthetic fiber and the carbon nanotube is adhered to the surface of the synthetic fiber by the surfactant.

* * * * *